United States Patent
Abe

(10) Patent No.: US 10,836,211 B2
(45) Date of Patent: Nov. 17, 2020

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Chuo-ku (JP)

( * ) Notice: Subject to any disclaimer, the term of this patent is extended or adjusted under 35 U.S.C. 154(b) by 316 days.

(21) Appl. No.: 15/764,068

(22) PCT Filed: Oct. 4, 2016

(86) PCT No.: PCT/JP2016/079405
§ 371 (c)(1),
(2) Date: Mar. 28, 2018

(87) PCT Pub. No.: WO2017/061405
PCT Pub. Date: Apr. 13, 2017

(65) Prior Publication Data
US 2018/0222254 A1    Aug. 9, 2018

(30) Foreign Application Priority Data
Oct. 9, 2015   (JP) .................................. 2015-201279

(51) Int. Cl.
*B60C 7/14* (2006.01)
*B60B 9/04* (2006.01)

(52) U.S. Cl.
CPC .................. *B60C 7/14* (2013.01); *B60B 9/04* (2013.01); *B60B 2200/22* (2013.01); *B60B 2900/321* (2013.01); *B60C 2007/146* (2013.01)

(58) Field of Classification Search
CPC ....... B60C 7/14; B60C 7/18; B60C 2007/107; B60C 2007/146; B60B 9/04
See application file for complete search history.

(56) References Cited

U.S. PATENT DOCUMENTS

| 1,187,042 A | * | 6/1916 | Baker | .................. B60B 9/04 |
| 1,442,897 A | | 1/1923 | Murray | 152/3 |

(Continued)

FOREIGN PATENT DOCUMENTS

| CN | 103129308 A | 6/2013 |
| CN | 104736355 A | 6/2015 |

(Continued)

OTHER PUBLICATIONS

Communication dated Aug. 28, 2018 from the European Patent Office in counterpart application No. 16853559.9.

(Continued)

*Primary Examiner* — Kip T Kotter
(74) *Attorney, Agent, or Firm* — Sughrue Mion, PLLC

(57) ABSTRACT

According to the present invention, when a first point (P1) is set on an end edge on an outer end portion (15a) side of a coupling member (15) and a fifth point (P5) is set on an end edge on an inner end portion (15b) side of the coupling member (15), and when a distance (H1) from the fifth point (P5) to the second point (P2) along a reference straight line (RL) passing through the first point (P1) and a tire axis is set to 0.80 times a reference distance (H) from the fifth point (P5) to the first point (P1) along the reference straight line, a distance (H2) from the fifth point (P5) to the third point along the reference straight line is set to 0.65 times the reference distance (H), and a distance (H3) from the fifth point (P5) to the fourth point (P4) along the reference straight line is set to 0.30 times the reference distance (H), the third point (P3) is disposed on the other side in the tire circumferential direction of an overall inclined straight line (SL) passing through the first point (P1) and the fifth point (P5), and a horizontal distance (D2) between the second point (P2) and the third point (P3) in a perpendicular direction (D) perpendicular to the reference straight line (Continued)

(RL) is larger than each of a horizontal distance D1 between the first point (P1) and the second point (P2) in the perpendicular direction (D) and a horizontal distance (D4) between the fourth point (P4) and the fifth point (P5) in the perpendicular direction (D).

9 Claims, 3 Drawing Sheets

(56) References Cited

U.S. PATENT DOCUMENTS

| | | | | |
|---|---|---|---|---|
| 2004/0069385 | A1* | 4/2004 | Timoney | B60B 9/26 152/69 |
| 2009/0294000 | A1* | 12/2009 | Cron | B60C 7/18 152/5 |
| 2013/0240097 | A1* | 9/2013 | Cron | B29C 41/042 152/17 |
| 2014/0062168 | A1* | 3/2014 | Martin | B60C 7/10 301/62 |
| 2014/0251518 | A1 | 9/2014 | Abe et al. | |
| 2015/0174953 | A1* | 6/2015 | Cron | B60B 9/26 152/11 |
| 2015/0246577 | A1* | 9/2015 | Fudemoto | B60B 9/04 152/84 |
| 2015/0273946 | A1 | 10/2015 | Abe et al. | |
| 2015/0283851 | A1 | 10/2015 | Abe et al. | |
| 2016/0167434 | A1 | 6/2016 | Nishida et al. | |
| 2016/0250893 | A1 | 9/2016 | Shoji et al. | |
| 2016/0272006 | A1 | 9/2016 | Abe | |

FOREIGN PATENT DOCUMENTS

| | | | | |
|---|---|---|---|---|
| EP | 2 679 406 A1 | | 1/2014 | |
| GB | 191601 A | * | 1/1923 | B60B 9/04 |
| JP | 3-189202 A | | 8/1991 | |
| JP | 2013-086712 A | | 5/2013 | |
| JP | 2014-091453 A | | 5/2014 | |
| JP | 2014-189095 A | | 10/2014 | |
| JP | 2015-080965 A | | 4/2015 | |
| WO | 2014/069570 A1 | | 5/2014 | |
| WO | 2015/072314 A1 | | 5/2015 | |

OTHER PUBLICATIONS

International Search Report for PCT/JP2016/079405 dated Nov. 8, 2016 [PCT/ISA/210].

Communication dated Jun. 27, 2019 from the China National Intellectual Property of Administration in counterpart Application No. 201680058303.6.

* cited by examiner

NON-PNEUMATIC TIRE

TECHNICAL FIELD

The present invention relates to a non-pneumatic tire which does not need to be filled with pressurized air, when in use.

This application is a National Stage of International Application No. PCT/JP2016/079405, filed on Oct. 4, 2016, which claims priority from Priority is claimed on Japanese Patent Application No. 2015-201279, filed Oct. 9, 2015, the content of which is incorporated herein by reference.

BACKGROUND ART

In conventional pneumatic tires which are filled with pressurized air and used, occurrence of a flat tire is an inevitable problem from a structural perspective.

To resolve such a problem, in recent years, a non-pneumatic tire including an attachment body attached to an axle, an outer cylindrical body which surrounds the attachment body from the outside in the tire radial direction, and a coupling body which couples the outer cylindrical body and the attachment body has been proposed as described in Patent Document 1 below, for example. The coupling body includes a plurality of coupling members disposed at intervals in a tire circumferential direction, opposite ends of each of the coupling members are respectively coupled to the attachment body and the outer cylindrical body, and a first end portion which is an outer end portion in the tire radial direction is positioned on one side in the tire circumferential direction of a second end portion which is an inner end portion in the tire radial direction.

CITATION LIST

Patent Document

[Patent Document 1]
Japanese Unexamined Patent Application, First Publication No. 2013-86712

SUMMARY OF INVENTION

Technical Problem

However, in such a conventional non-pneumatic tire, there is room for improvement in preventing concentration of stress generated in the coupling member when a load is applied to the non-pneumatic tire and in enhancing durability.

The present invention is made in consideration of the above-described circumstances, and an object of the present invention is to enhance durability.

Solution to Problem

A non-pneumatic tire according to the present invention includes an attachment body attached to an axle, an outer cylindrical body which surrounds the attachment body from the outside in a tire radial direction, and a coupling body which couples the outer cylindrical body and the attachment body, in which the coupling body includes a plurality of coupling members disposed at intervals in a tire circumferential direction, opposite ends of each of the coupling members are respectively coupled to the attachment body and the outer cylindrical body, and a first end portion which is an outer end portion of the coupling member in the tire radial direction is positioned on one side in the tire circumferential direction of a second end portion which is an inner end portion in the tire radial direction, in which, in a tire side view when the non-pneumatic tire is viewed from a tire width direction, when a first point, a second point, a third point, a fourth point, and a fifth point are set in order from the first end portion side toward the second end portion side on a center line passing through a center in the tire circumferential direction of the coupling member over the entire length from the first end portion to the second end portion of the coupling member, when the first point is set on an end edge on the first end portion side of the coupling member and the fifth point is set on an end edge on the second end portion side of the coupling member, and when a distance H1 from the fifth point to the second point along a reference straight line passing through the first point and a tire axis is set to 0.80 times a reference distance H from the fifth point to the first point along the reference straight line, a distance H2 from the fifth point to the third point along the reference straight line is set to 0.65 times the reference distance H, and a distance H3 from the fifth point to the fourth point along the reference straight line is set to 0.30 times the reference distance H, the third point is disposed on the other side in the tire circumferential direction of an overall inclined straight line passing through the first point and the fifth point, and a horizontal distance D2 between the second point and the third point in a perpendicular direction perpendicular to the reference straight line is larger than each of a horizontal distance D1 between the first point and the second point in the perpendicular direction and a horizontal distance D4 between the fourth point and the fifth point in the perpendicular direction.

Effects of Invention

According to the present invention, durability can be enhanced.

DESCRIPTION OF EMBODIMENTS

Figure 1:
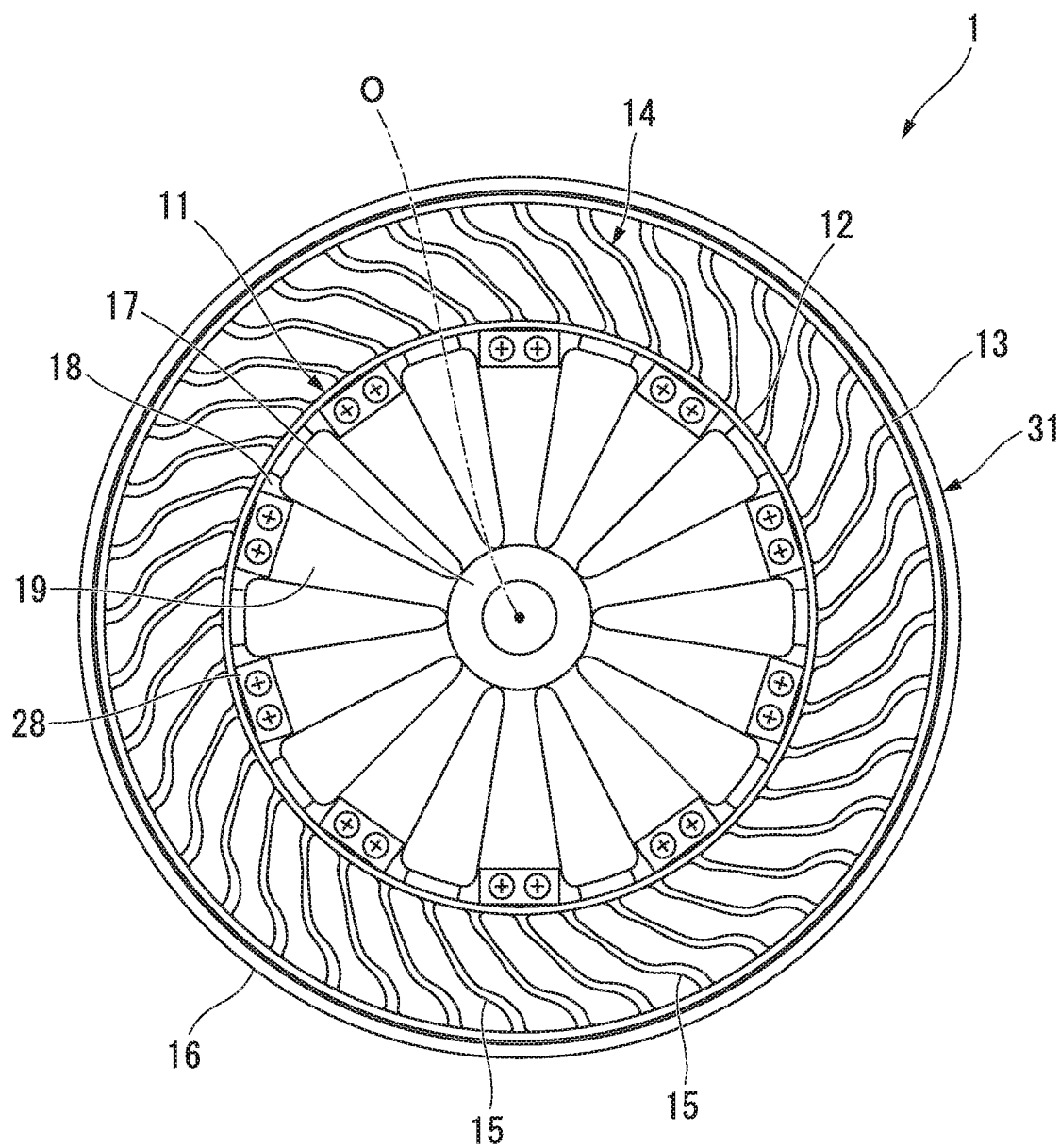
FIG. 1 is a side view of a non-pneumatic tire according to one embodiment of the present invention.
Figure 2:
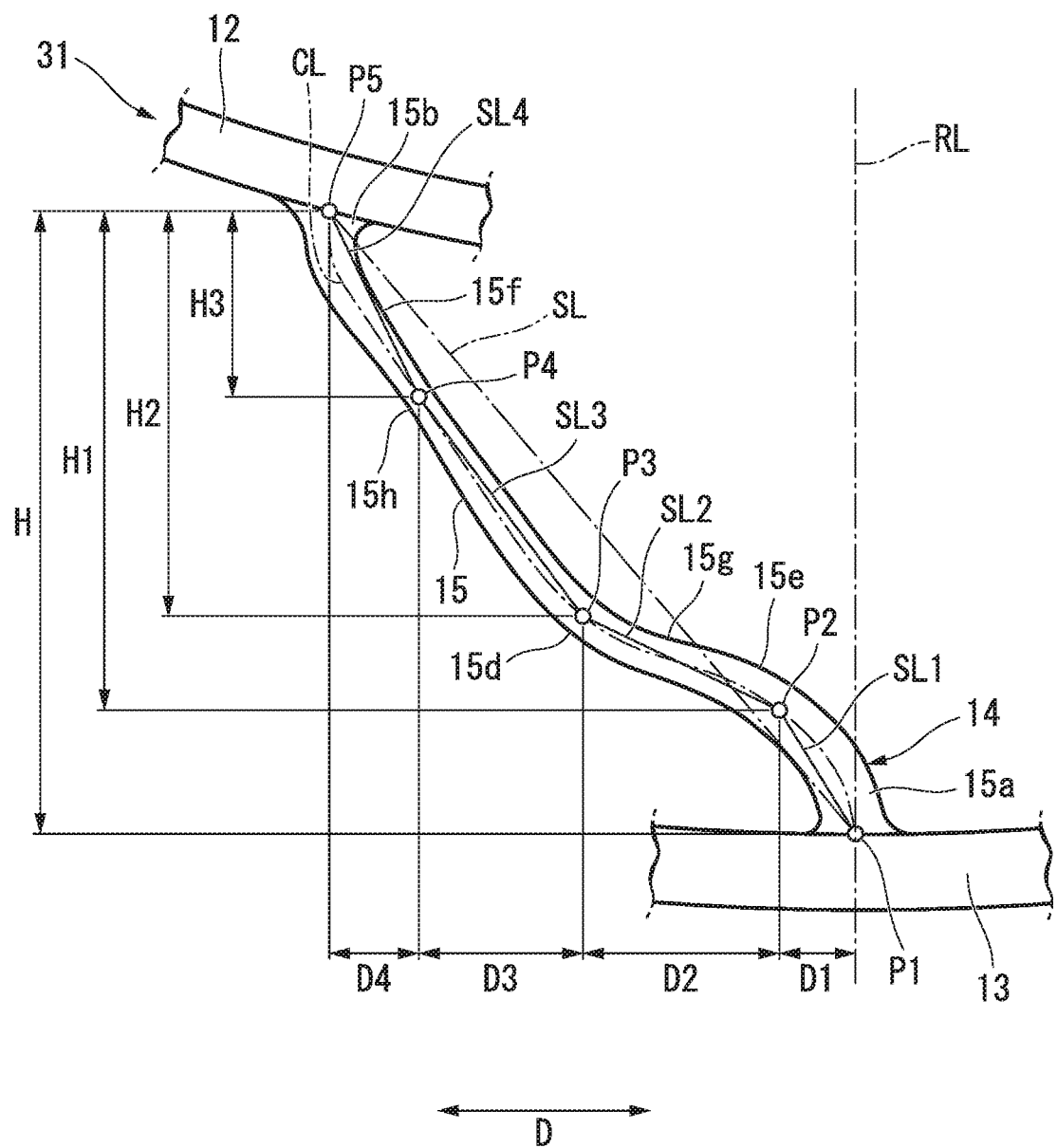
FIG. 2 is a side view in which a main portion of the non-pneumatic tire shown in FIG. 1 is enlarged and reference distances between points are shown.
Figure 3:
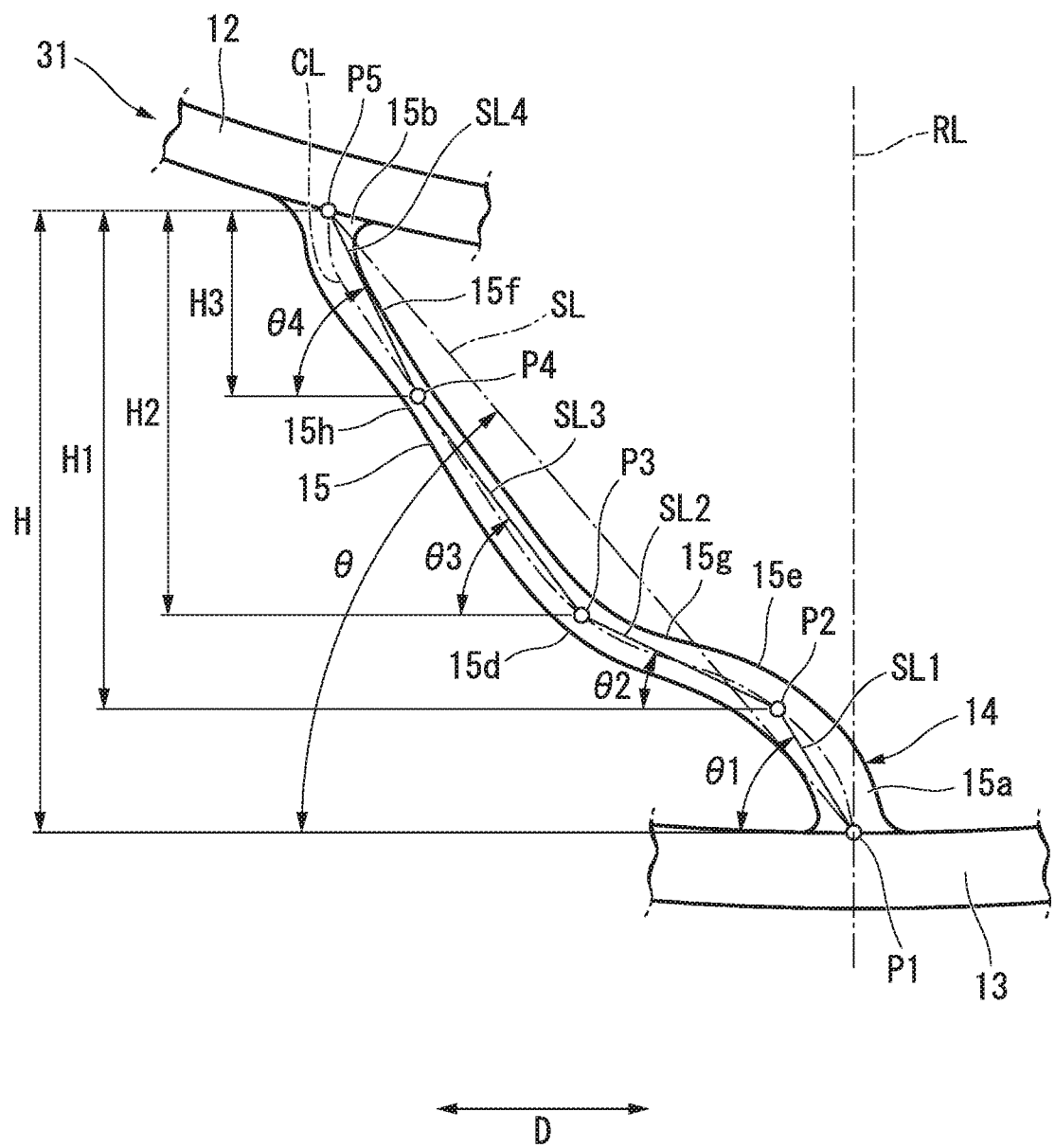
FIG. 3 is a side view in which a main portion of the non-pneumatic tire shown in FIG. 1 is enlarged and inclination angles related to each point are shown.

As shown in FIGS. 1 to 3, a non-pneumatic tire 1 of the present embodiment includes an attachment body 11 attached to an axle (not shown), an outer cylindrical body 13 in a cylindrical shape which surrounds the attachment body 11 from the outside in a tire radial direction, a coupling body 14 which couples the attachment body 11 and the outer cylindrical body 13, and a cylindrical tread member 16 wrapped externally around the outer cylindrical body 13.

Also, the non-pneumatic tire 1 of the present embodiment may be employed in a small-sized vehicle traveling at a low speed such as a handle type electric wheelchair specified in Japanese Industrial Standard JIS T 9208, for example. In addition, the size of the non-pneumatic tire 1 is not particularly limited, but may be in a range of 3.00-8 or the like, for example. Also, the non-pneumatic tire 1 may be employed for passenger cars. The size in this case is not particularly limited, but may be 155/65R 13 or the like, for example.

The above-described attachment body 11, the outer cylindrical body 13, and the tread member 16 are coaxially arranged on a common axis. Hereinafter, this common axis is referred to as an axis O, a direction along the axis O is referred to as a tire width direction, a direction perpendicular to the axis O is referred to as a tire radial direction, and a direction of revolving around the axis O is referred to as a tire circumferential direction. Also, center portions in the tire width direction of the attachment body 11, the outer cylindrical body 13, and the tread member 16 coincide with each other.

The attachment body 11 includes a fitting cylinder portion 17 to which a distal end portion of the axle is fitted, an outer ring portion 18 which surrounds the fitting cylinder portion 17 from the outside in the tire radial direction, and a plurality of ribs 19 which couple the fitting cylinder portion 17 to the outer ring portion 18.

The fitting cylinder portion 17, the outer ring portion 18, and the ribs 19 are integrally formed of a metal material such as an aluminum alloy, for example. The fitting cylinder portion 17 and the outer ring portion 18 are formed in a cylindrical shape and are coaxially arranged on the axis O. The plurality of ribs 19 are disposed at regular intervals in the tire circumferential direction, for example.

A plurality of key groove portions (not shown) recessed toward the inside in the tire radial direction and configured to extend in the tire width direction are formed on an outer circumferential surface of the outer ring portion 18 at intervals in the tire circumferential direction. On the outer circumferential surface of the outer ring portion 18, the key groove portions are open only on one side (outer side of the vehicle body) in the tire width direction and are closed on the other side (inside the vehicle body) in the tire width direction.

An inner cylindrical body 12 in a cylindrical shape which is externally fitted to the outer ring portion 18 is provided on the attachment body 11. A ridge portion (not shown) protruding toward the inside in the tire radial direction and extending over the entire length in the tire width direction is formed on an inner circumferential surface of the inner cylindrical body 12. A plurality of ridge portions are formed on the inner circumferential surface of the inner cylindrical body 12 at intervals in the tire circumferential direction and respectively engaged with the key groove portions.

Thus, the inner cylindrical body 12 is fixed to the attachment body 11 in a state in which the ridge portions are engaged with the key groove portions. In the shown example, the inner cylindrical body 12 is fixed to the attachment body 11 by screwing plates 28 from one side in the tire width direction at a position corresponding to the key groove portions in the outer ring portion 18.

A plurality of coupling bodies 14 are arranged in a tire circumferential direction between the attachment body 11 and the outer cylindrical body 13, and each of the coupling bodies 14 includes a coupling member 15 which couples the attachment body 11 and the outer cylindrical body 13 in an elastically relatively displaceable manner. A plurality of coupling members 15 are disposed at intervals in the tire circumferential direction, opposite ends of each of the coupling members 15 are respectively coupled to the attachment body 11 and the outer cylindrical body 13, and a first end portion (outer end portion 15a) which is an outer end portion in the tire radial direction is positioned on one side in the tire circumferential direction of the second end portion (inner end portion 15b) which is an inner end portion in the tire radial direction. The coupling member 15 gradually extends toward the other side in the tire circumferential direction from the outside toward the inside in the tire radial direction.

The coupling member 15 couples an outer circumferential surface side of the attachment body 11 to an inner circumferential surface side of the outer cylindrical body 13 in an elastically relatively displaceable manner. The coupling member 15 is an elastically deformable plate whose front and rear surfaces are directed in the tire circumferential direction. A plurality of coupling members 15 are disposed in the tire circumferential direction. The plurality of coupling members 15 are respectively disposed at positions rotationally symmetrical with respect to the axis O between the inner cylindrical body 12 and the outer cylindrical body 13. All the coupling members 15 have the same shape and the same size, and the width of the coupling members 15 in the tire width direction is smaller than the width of the outer cylindrical body 13 in the tire width direction. Adjacent coupling members 15 in the tire circumferential direction are not in contact with each other.

As shown in FIGS. 2 and 3, in each of the coupling members 15, a first end portion (outer end portion 15a) coupled to the outer cylindrical body 13 is positioned on one side in the tire circumferential direction of the second end portion (inner end portion 15b) coupled to the inner cylindrical body 12.

A plurality of curved portions 15d to 15f which are curved in the tire circumferential direction are formed in the coupling member 15 at intermediate portions between the outer end portion 15a and the inner end portion 15b. The plurality of curved portions 15d to 15f are formed along an extending direction in which the coupling member 15 extends in a tire side view when the non-pneumatic tire 1 is viewed from the tire width direction. In the shown example, the plurality of curved portions 15d to 15f of the coupling member 15 are adjacent to each other in the above-described extending direction while having curvature directions opposite to each other.

The plurality of curved portions 15d to 15f include a first curved portion 15d curved to protrude toward the other side in the tire circumferential direction, a second curved portion 15e positioned between the first curved portion 15d and the outer end portion 15a and curved to protrude toward one side in the tire circumferential direction, and a third curved portion 15f positioned between the first curved portion 15d and the inner end portion 15b and curved to protrude toward one side in the tire circumferential direction. In addition, inflection portions 15g and 15h are formed in the coupling member 15 at portions positioned between each of the curved portions 15d to 15f adjacent to each other in the extending direction of the coupling member 15.

The above-described inner cylindrical body 12, the outer cylindrical body 13, and the plurality of coupling members 15 (the coupling body 14) are integrally formed of a synthetic resin material, for example. The synthetic resin material may be, for example, a single resin material, a mixture containing two or more kinds of resin material, or a mixture containing one or more kinds of resin material and one or more kinds of elastomer, and furthermore, may include additives such as anti-aging agents, plasticizers, fillers, or pigments, for example.

Hereinafter, a unit in which the inner cylindrical body 12, the outer cylindrical body 13, and the coupling member 15 are integrally formed is referred to as a case body 31.

The case body 31 can be integrally formed by injection molding, for example. The injection molding may include a general method of molding the entire case body 31 at once, insert molding in which the remaining portions other than insert parts are injection molded with some portions among the inner cylindrical body 12, the outer cylindrical body 13, and the coupling member 15 being provided as the insert parts, a so-called two-color molding, or the like. In addition, when the entirety of the case body 31 is injection-molded at once, a plurality of protrusions formed on the inner cylindrical body 12 may be a gate portion. Further, at the time of injection-molding, the inner cylindrical body 12, the outer cylindrical body 13, and the coupling member 15 may be formed of different materials, or may be formed of the same material. As such materials, metal materials, resin materials, or the like are examples; however, resin materials, particularly thermoplastic resins, are preferable from the perspective of reducing weight.

As shown in FIG. 1, the tread member 16 is formed in a cylindrical shape and integrally covers an outer circumferential surface side of the outer cylindrical body 13 over the entire region. An inner circumferential surface of the tread member 16 is in close contact with the outer circumferential surface of the outer cylindrical body 13 over the entire region. The tread member 16 is formed of a natural rubber and/or a vulcanized rubber in which the rubber composition is vulcanized, a thermoplastic material, or the like, for example.

As the thermoplastic material, a thermoplastic elastomer, a thermoplastic resin, or the like is an example. As thermoplastic elastomers, amide-based thermoplastic elastomers (TPA), ester-based thermoplastic elastomers (TPC), olefin-based thermoplastic elastomers (TPO), styrene-based thermoplastic elastomers (TPS), urethane-based thermoplastic elastomers (TPU), a thermoplastic rubber cross-linked body (TPV), other thermoplastic elastomers (TPZ), or the like, specified in Japanese Industrial Standard JIS K6418, are examples.

As the thermoplastic resin, urethane resins, olefin resins, vinyl chloride resins, polyamide resins, or the like are examples. Also, it is preferable to form the tread member 16 with a vulcanized rubber from the perspective of wear resistance.

In the present embodiment, the non-pneumatic tire 1 satisfies the following relationships.

That is, first, as shown in FIGS. 2 and 3, in a tire side view when the non-pneumatic tire 1 is viewed from the tire width direction, a first point P1, a second point P2, a third point P3, a fourth point P4, and a fifth point P5 are set in order from the outer end portion 15a side toward the inner end portion 15b side on a center line CL passing through a center in the tire circumferential direction of the coupling member 15 over the entire length from the outer end portion 15a to the inner end portion 15b of the coupling member 15. Among these first point P1 to the fifth point P5, the first point P1 is set on an end edge on the outer end portion 15a side of the coupling member 15 and the fifth point P5 is set on an end edge on the inner end portion 15b side of the coupling member 15. Further, the end edge on the outer end portion 5a side of the coupling member 15 is positioned on the inner circumferential surface of the outer cylindrical body 13 and the end edge on the inner end portion 15b side of the coupling member 15 is positioned on an outer circumferential surface of the inner cylindrical body 12. Also, the distance between the first point P1 and the fifth point P5 along a reference straight line RL passing through the first point P1 and the axis O (tire axis) is referred to as 1H. Further, the reference straight line RL extends in a tangential direction with respect to a portion of the inner circumferential surface of the outer cylindrical body 13 at which the first point P1 is positioned. Then, a distance H1 from the fifth point P5 to the second point P2 along the reference straight line RL is set to 0.80 times the reference distance H, a distance H2 from the fifth point P5 to the third point P3 along the reference straight line is set to 0.65 times the reference distance H, and a distance H3 from the fifth point P5 to the fourth point P4 along the reference straight line is set to 0.30 times the reference distance H.

At this time, as shown in FIG. 2, the third point P3 is disposed on the other side in the tire circumferential direction of an overall inclined straight line SL passing through the first point P1 and the fifth point P5. Also, a horizontal distance D2 between the second point P2 and the third point P3 in a perpendicular direction D perpendicular to the reference straight line RL, is larger than a horizontal distance D1 between the first point P1 and the second point P2 in the perpendicular direction D and a horizontal distance D4 between the fourth point P4 and the fifth point P5 in the perpendicular direction D.

In the present embodiment, a horizontal distance D3 between the third point P3 and the fourth point P4 in the perpendicular direction D is larger than each of the horizontal distance D1 and the horizontal distance D4.

As shown in FIG. 2, the second point P2 is disposed on one side in the tire circumferential direction of the overall inclined straight line SL passing through the first point P1 and the fifth point P5. The second inclined straight line SL2 passing through the second point P2 and the third point P3 intersects the overall inclined straight line SL.

That is, when a portion in which the third point P3 is positioned protrudes to the other side in the tire circumferential direction, a portion in which the second point P2 is positioned protrudes to one side in the tire circumferential direction.

Also, as shown in FIG. 3, an inclination angle $\theta 2$ of a second inclined straight line SL2 passing through the second point P2 and the third point P3 with respect to the perpendicular direction D is smaller than an inclination angle $\theta 1$ of a first inclined straight line SL1 passing through the first point P1 and the second point P2 with respect to the perpendicular direction D and an inclination angle $\theta 4$ of a fourth inclined straight line SL4 passing through the fourth point P4 and the fifth point P5 with respect to the perpendicular direction D.

Further, an inclination angle $\theta 3$ of a third inclined straight line SL3 passing through the third point P3 and the fourth point P4 with respect to the perpendicular direction D is larger than the inclination angle $\theta 2$, and the inclination angle $\theta 4$ is larger than the inclination angle $\theta 3$.

Thus, a thickness (plate thickness) which is a size in the tire circumferential direction of the coupling member 15 gradually decreases (becomes thinner) from each of the first point P1 and the fifth point P5 toward the fourth point P4.

Also, in the present embodiment, an inclination angle $\theta$ of the overall inclined straight line SL with respect to the perpendicular direction D and the inclination angle $\theta 3$ satisfy a relationship of the following expression (1).

$$0.9 < (\theta 3/\theta) < 1.2 \tag{1}$$

Further, in the present embodiment, the inclination angles $\theta 1$, $\theta 2$, $\theta 3$, and $\theta 4$ satisfy relationships of the following expressions (2) to (5).

$$0.35 < (\theta 2/\theta 1) < 0.95 \tag{2}$$

$$0.3 < (\theta 2/\theta 4) < 0.8 \tag{3}$$

$$0.4<(\theta2/\theta3)<0.9 \quad (4)$$

$$0.7<(\theta3/\theta4)<0.95 \quad (5)$$

Further, it is preferable that the inclination angles θ, θ1, θ2, θ3, and θ4 satisfy relationships of the following expressions (1)' to (5)'.

$$1.00\leq(\theta3/\theta)\leq1.10 \quad (1)'$$

$$0.44\leq(\theta2/\theta1)\leq0.89 \quad (2)'$$

$$0.38\leq(\theta2/\theta4)\leq0.67 \quad (3)'$$

$$0.46\leq(\theta2/\theta3)\leq0.80 \quad (4)'$$

$$0.82\leq(\theta3/\theta4)\leq0.92 \quad (5)'$$

As described above, according to the non-pneumatic tire 1 of the present embodiment, since the third point P3 is disposed on the other side in the tire circumferential direction of the overall inclined straight line SL, it is possible to cause the portion of the coupling member 15 at which the third point P3 is positioned to protrude to the other side in the tire circumferential direction. In addition, since the horizontal distance D2 between the second point P2 and the third point P3 is larger than the horizontal distance D1 between the first point P1 and the second point P2 and the horizontal distance D4 between the fourth point P4 and the fifth point P5, a portion of the coupling member 15 positioned between the second point P2 and the third point P3 can to a great extent be easily made to lie against the reference straight line RL.

As described above, when a compressive force in the tire radial direction is applied to the coupling member 15 between the attachment body 11 and the outer cylindrical body 13, a center portion of the coupling member 15 from the second point P2 to the fourth point P4 through the third point P3 is gently bent and deformed toward the other side in the tire circumferential direction so that the both end portions of the coupling member 15 cannot be easily deformed. Thereby, concentration of stress in the coupling member 15 can be prevented and durability can be enhanced.

In addition, the inclination angle θ2 of the second inclined straight line SL2 is smaller than the inclination angle θ1 of the first inclined straight line SL1 and the inclination angle θ4 of the fourth inclined straight line SL4. Therefore, the portion of the coupling member 15 positioned between the second point P2 and the third point P3 can be reliably made to lie against the reference straight line RL.

Since the inclination angle θ3 of the third inclined straight line SL3 is larger than the inclination angle θ2 of the second inclined straight line SL2, the center portion of the coupling member 15 is formed to protrude toward the other side in the tire circumferential direction in a tire side view so that it can be easily bent and deformed.

Since the inclination angle θ4 of the fourth inclined straight line SL4 is larger than the inclination angle θ3 of the third inclined straight line SL3, a portion of the coupling member 15 positioned between the fourth point P4 and the fifth point P5 can be raised up as compared with the portion positioned between the second point P2 and the third point P3. Thereby, it is possible to effectively prevent deformation of the inner end portion 15b of the coupling member 15.

In addition, since a size of the coupling member 15 in the tire circumferential direction gradually decreases from each of the first point P1 and the fifth point P5 toward the fourth point P4, when the coupling member 15 is deformed, it is possible to easily deform the coupling member 15 with a portion positioned on the fourth point P4 of the coupling member 15 as a starting point. Thereby, it is possible to actively and easily bend and deform the center portion of the coupling member 15.

The technical scope of the present invention is not limited to the above embodiments, and various modifications can be added to the scope of the present invention without departing from the spirit of the present invention.

For example, although in the above-described embodiment, the inner cylindrical body 12, the outer cylindrical body 13, and the coupling member 15 are integrally formed by, for example, injection molding, the present invention is not limited to injection molding, and they may be integrally formed by, for example, casting or the like. Also, the inner cylindrical body 12, the outer cylindrical body 13, and the coupling member 15 may be individually formed and then coupled to each other.

Further, in the embodiment described above, the coupling member 15 is indirectly coupled to the outer ring portion 18 of the attachment body 11 via the inner cylindrical body 12, but the present invention is not limited thereto, and, for example, the coupling member 15 may be directly coupled to the outer ring portion 18 of the attachment body 11. In this case, the end edge on the inner end portion 15b side of the coupling member 15 is positioned on the outer circumferential surface of the outer ring portion 18, and the fifth point P5 can be set on the outer circumferential surface of the outer ring portion 18.

In addition, the components in the above-described embodiments can be appropriately replaced with well-known components without departing from the spirit and scope of the present invention, and furthermore, the above-described modified examples may be appropriately combined.

Next, a verification test on the operation and effects described above was conducted.

In this verification test, for each non-pneumatic tire of a comparative example and an example, in a simulation using a finite element method, maximum values of stress generated in tires when a load was applied were compared.

With the non-pneumatic tire shown in FIG. 1 being assumed to be a basic shape, in each non-pneumatic tire of the comparative example and the example, values of the inclination angles θ1 to θ4 and θ and the horizontal distances D1 to D4 were set to respective values as shown in Table 1 below.

In Table 1, the unit of each value of the inclination angles θ1 to θ4, and θ is "degrees (°)" and the unit of each value of the horizontal distances D1 to D4 is "millimeters (mm)."

TABLE 1

|  | Comparative example | Example |
| --- | --- | --- |
| θ1 | 38.1 | 52.7 |
| θ2 | 58.9 | 23.5 |
| θ3 | 56.0 | 50.7 |
| θ4 | 39.6 | 62.1 |
| θ | 46.7 | 46.7 |
| D1 | 15.5 | 9.3 |
| D2 | 5.5 | 21.0 |
| D3 | 14.4 | 17.4 |
| D4 | 22.0 | 9.7 |

As shown in each value in Table 1, in the non-pneumatic tire of the example, a horizontal distance D2 was larger than each of horizontal distances D1 and D4, an inclination angle θ2 was smaller than each of inclination angles θ1 and θ4, an inclination angle $\theta 3$ was larger than the inclination angle $\theta 2$, and the inclination angle $\theta 4$ was larger than the inclination angle $\theta 3$.

On the other hand, in the non-pneumatic tire of the comparative example, a horizontal distance D2 was smaller than each of horizontal distances D1 and D4, an inclination angle $\theta 2$ was larger than each of inclination angles $\theta 1$ and $\theta 4$, an inclination angle $\theta 3$ was smaller than the inclination angle $\theta 2$, and the inclination angle $\theta 4$ was smaller than an inclination angle $\theta 3$.

As a result of this verification test, it was confirmed that a maximum stress in the non-pneumatic tire of the example was reduced to 55 when a maximum stress in the non-pneumatic tire of the comparative example was set to 100.

According to the present invention, since the third point is disposed on the other side in the tire circumferential direction of the overall inclined straight line, it is possible to cause a portion of the coupling member in which the third point is positioned to protrude to the other side in the tire circumferential direction. In addition, since the horizontal distance D2 between the second point and the third point is larger than the horizontal distance D1 between the first point and the second point and larger than the horizontal distance D4 between the fourth point and the fifth point, a portion of the coupling member positioned between the second point and the third point can to a great extent be easily made to lie against the reference straight line.

As described above, when a compressive force in the tire radial direction is applied to the coupling member between the attachment body and the outer cylindrical body, a center portion of the coupling member from the second point to the fourth point through the third point is gently bent and deformed toward the other side in the tire circumferential direction so that the both end portions of the coupling member cannot be easily deformed. Thereby, concentration of stress in the coupling member can be prevented and durability can be enhanced.

The inclination angle $\theta 2$ of the second inclined straight line passing through the second point and the third point with respect to the perpendicular direction may be smaller than the inclination angle $\theta 1$ of the first inclined straight line passing through the first point and the second point with respect to the perpendicular direction and smaller than the inclination angle $\theta 4$ of the fourth inclined straight line passing through the fourth point and the fifth point with respect to the perpendicular direction.

In this case, the inclination angle $\theta 2$ of the second inclined straight line is smaller than each of the inclination angle $\theta 1$ of the first inclined straight line and the inclination angle $\theta 4$ of the fourth inclined straight line. Therefore, the portion of the coupling member positioned between the second point and the third point can to a great extent be reliably made to lie against the reference straight line.

The inclination angle $\theta 3$ of the third inclined straight line passing through the third point and the fourth point with respect to the perpendicular direction may be larger than the inclination angle $\theta 2$.

In this case, since the inclination angle $\theta 3$ of the third inclined straight line is larger than the inclination angle $\theta 2$ of the second inclined straight line, the center portion of the coupling member is formed to protrude toward the other side in the tire circumferential direction in a tire side view so that it can be easily bent and deformed.

The inclination angle $\theta 4$ may be larger than the inclination angle $\theta 3$.

In this case, since the inclination angle $\theta 4$ of the fourth inclined straight line is larger than the inclination angle $\theta 3$ of the third inclined straight line, the portion of the coupling member positioned between the fourth point and the fifth point can be raised up as compared with the portion positioned between the second point and the third point. Thereby, it is possible to effectively prevent deformation of the second end portion of the coupling member.

The size of the coupling member in the tire circumferential direction may gradually decrease from each of the first point and the fifth point toward the fourth point.

In this case, since the size of the coupling member in the tire circumferential direction gradually decreases from each of the first point and the fifth point toward the fourth point, when the coupling member is deformed, it is possible to easily deform the coupling member with a portion positioned on the fourth point of the coupling member as a starting point. Thereby, it is possible to actively and easily bend and deform the center portion of the coupling member.

INDUSTRIAL APPLICABILITY

According to the present invention, durability of the non-pneumatic tire can be enhanced.

REFERENCE SIGNS LIST

1 Non-pneumatic tire
11 Attachment body
13 Outer cylindrical body
14 Coupling body
15 Coupling member
15a Outer end portion (a first end portion)
15b Inner end portion (the second end portion)
CL Center line
D Perpendicular direction
D1, D2, D4 Horizontal distance
H Reference distance
H1, H2, H3 Distance
O Axis (tire axis)
P1 First point
P2 Second point
P3 Third point
P4 Fourth point
P5 Fifth point
RL Reference straight line
SL Overall inclined straight line
SL1 First inclined straight line
SL2 Second inclined straight line
SL3 Third inclined straight line
SL4 Fourth inclined straight line
$\theta$, $\theta 1$, $\theta 2$, $\theta 3$, $\theta 4$ Inclination angle

What is claimed is:
1. A non-pneumatic tire comprising:
an attachment body attachable to an axle;
an inner cylindrical body which is provided on the attachment body;
an outer cylindrical body which surrounds the attachment body from the outside in a tire radial direction; and
a coupling body which couples the outer cylindrical body and the inner cylindrical body, wherein the coupling body includes a plurality of coupling members disposed at intervals in a tire circumferential direction, opposite ends of each of the coupling members are respectively coupled to the inner cylindrical body and the outer cylindrical body, and a first end portion which is an outer end portion of each of the coupling members in the tire radial direction is positioned on one side in the tire circumferential direction of a second end portion which is an inner end portion in the tire radial direction, wherein, in a tire side view when the non-pneumatic tire is viewed from a tire width direction, when a first point, a second point, a third point, a fourth point, and a fifth point are set in order from the first end portion side toward the second end portion side on a center line passing through a center in the tire circumferential direction of each of the coupling members over the entire length from the first end portion to the second end portion of each of the coupling members, when the first point is set on an end edge on the first end portion side of each of the coupling members and the fifth point is set on an end edge on the second end portion side of each of the coupling members, and when a distance H1 from the fifth point to the second point along a reference straight line passing through the first point and a tire axis is set to 0.80 times a reference distance H from the fifth point to the first point along the reference straight line, a distance H2 from the fifth point to the third point along the reference straight line is set to 0.65 times the reference distance H, and a distance H3 from the fifth point to the fourth point along the reference straight line is set to 0.30 times the reference distance H, the third point is disposed on the other side in the tire circumferential direction of an overall inclined straight line passing through the first point and the fifth point, and a horizontal distance D2 between the second point and the third point in a perpendicular direction perpendicular to the reference straight line is larger than each of a horizontal distance D1 between the first point and the second point in the perpendicular direction and a horizontal distance D4 between the fourth point and the fifth point in the perpendicular direction, the inner cylindrical body, the outer cylindrical body, and the plurality of coupling members are integrally formed of a synthetic resin material, and each of the coupling members couples an outer circumferential surface side of the inner cylindrical body to an inner circumferential surface side of the outer cylindrical body in an elastically relatively displaceable manner.

2. The non-pneumatic tire according to claim 1, wherein an inclination angle $\theta 2$ of a second inclined straight line passing through the second point and the third point with respect to the perpendicular direction is smaller than each of an inclination angle $\theta 1$ of a first inclined straight line passing through the first point and the second point with respect to the perpendicular direction and an inclination angle $\theta 4$ of a fourth inclined straight line passing through the fourth point and the fifth point with respect to the perpendicular direction.

3. The non-pneumatic tire according to claim 2, wherein an inclination angle $\theta 3$ of a third inclined straight line passing through the third point and the fourth point with respect to the perpendicular direction is larger than the inclination angle $\theta 2$.

4. The non-pneumatic tire according to claim 3, wherein the inclination angle $\theta 4$ is larger than the inclination angle $\theta 3$.

5. The non-pneumatic tire according to claim 4, wherein a size of each of the coupling members in the tire circumferential direction gradually decreases from each of the first point and the fifth point toward the fourth point.

6. The non-pneumatic tire according to claim 3, wherein a size of each of the coupling members in the tire circumferential direction gradually decreases from each of the first point and the fifth point toward the fourth point.

7. The non-pneumatic tire according to claim 2, wherein a size of each of the coupling members in the tire circumferential direction gradually decreases from each of the first point and the fifth point toward the fourth point.

8. The non-pneumatic tire according to claim 1, wherein a size of each of the coupling members in the tire circumferential direction gradually decreases from each of the first point and the fifth point toward the fourth point.

9. The non-pneumatic tire according to claim 1, wherein the second point is disposed on one side in the tire circumferential direction of the overall inclined straight line passing through the first point and the fifth point.

* * * * *